United States Patent [19]

Reyman

[11] Patent Number: 5,174,478
[45] Date of Patent: Dec. 29, 1992

[54] DEVICE FOR THE CONTROLLED MEASURING AND DISPENSING OF A FLUID

[76] Inventor: Mark E. Reyman, 246 Centre Ave., Apt. 5N, New Rochelle, N.Y. 10805

[21] Appl. No.: 821,798

[22] Filed: Jan. 16, 1992

Related U.S. Application Data

[60] Division of Ser. No. 640,527, Jan. 10, 1991, Pat. No. 5,119,971, which is a continuation of Ser. No. 410,157, Sep. 20, 1989, abandoned, which is a continuation-in-part of Ser. No. 117,356, Oct. 27, 1987, abandoned, which is a continuation-in-part of Ser. No. 827,781, Feb. 7, 1986, abandoned.

[51] Int. Cl.⁵ .................. B65D 37/00; G01F 11/26
[52] U.S. Cl. ........................ 222/207; 222/211; 222/438; 222/454
[58] Field of Search ............ 222/207, 209, 211, 212, 222/215, 424.5, 426, 438, 439, 440, 430, 434, 454, 435, 456

[56] References Cited

U.S. PATENT DOCUMENTS

| | | |
|---|---|---|
| 1,949,130 | 2/1934 | Renfro. |
| 2,022,271 | 4/1935 | Bibb. |
| 2,091,929 | 5/1937 | Kappenberg. |
| 2,105,957 | 1/1938 | Severson. |
| 2,583,821 | 11/1948 | DuBois. |
| 2,599,466 | 4/1952 | Greene. |
| 2,661,127 | 12/1953 | Richards. |
| 2,728,491 | 12/1955 | Aneshansley. |
| 2,730,270 | 10/1956 | Heinemann. |
| 2,743,849 | 4/1956 | Elsas. |
| 2,744,663 | 5/1956 | White. |
| 2,760,692 | 8/1956 | Buehlig ................ 222/434 |
| 2,837,822 | 6/1958 | Willie. |
| 2,859,909 | 7/1958 | Kiyuna. |
| 2,951,264 | 9/1958 | Bailey. |
| 2,989,215 | 10/1958 | Willingham. |
| 2,989,216 | 2/1959 | Moro-Lin. |
| 3,010,614 | 11/1961 | Udy. |
| 3,029,001 | 4/1962 | Blish. |
| 3,064,863 | 11/1962 | Mattson. |
| 3,089,623 | 5/1963 | Padzieski. |
| 3,141,574 | 7/1964 | Donoghue. |
| 3,141,579 | 7/1964 | Medlock. |
| 3,190,505 | 6/1965 | Arbitman et al. |
| 3,246,807 | 4/1966 | Micallef. |
| 3,254,809 | 6/1966 | Breneman. |
| 3,324,349 | 4/1967 | Kaufman. |
| 3,347,420 | 10/1967 | Donoghue. |
| 3,369,713 | 2/1968 | Godschalk, Jr. |
| 3,402,860 | 9/1968 | Torongo, Jr. |
| 3,451,446 | 6/1969 | Russell. |
| 3,506,160 | 4/1970 | Forim. |
| 3,628,700 | 12/1971 | Dodoghue. |
| 3,685,702 | 8/1972 | Erwin. |
| 3,760,986 | 9/1973 | Castner et al. |
| 3,767,088 | 10/1973 | Deussen. |
| 3,921,860 | 11/1975 | Zackheim. |
| 4,077,547 | 3/1978 | Donoghue. |
| 4,079,859 | 3/1978 | Jennings. |
| 4,106,673 | 8/1978 | Donoghue. |
| 4,109,830 | 8/1978 | Zeigler et al. |
| 4,143,794 | 3/1979 | Stratford et al. |
| 4,143,797 | 3/1979 | Reed. |
| 4,157,768 | 6/1979 | Britt. |
| 4,211,346 | 7/1980 | Mehra et al. |
| 4,261,488 | 4/1981 | Bennett. |
| 4,273,271 | 6/1981 | Tiger. |
| 4,318,500 | 3/1982 | Melikian. |
| 4,335,837 | 6/1982 | Bono. |
| 4,376,495 | 3/1983 | Spatz. |
| 4,437,587 | 3/1984 | Duering. |
| 4,474,312 | 10/1984 | Donoghue. |
| 4,564,129 | 1/1986 | Urban et al. |
| 4,607,762 | 8/1986 | Zulauf et al. |
| 4,614,285 | 9/1986 | Fudalla et al. |
| 4,747,521 | 5/1988 | Saffron ..................... 222/207 |
| 4,773,562 | 9/1988 | Gueret. |
| 4,828,149 | 5/1989 | Hester ................. 222/440 X |
| 4,969,585 | 11/1990 | Hester ..................... 222/434 |

FOREIGN PATENT DOCUMENTS

| | | |
|---|---|---|
| 280820 | 4/1970 | Austria. |
| 522629 | 11/1956 | Belgium. |
| 0117423 | 5/1984 | European Pat. Off. |
| 0335505 | 10/1989 | European Pat. Off. ......... 222/207 |
| 2802210 | 7/1979 | Fed. Rep. of Germany. |
| 774149 | 11/1934 | France. |
| 1219473 | 3/1986 | U.S.S.R. ..................... 222/438 |
| 749407 | 5/1956 | United Kingdom. |
| 1219344 | 1/1971 | United Kingdom ......... 222/435 |
| 1559542 | 1/1980 | United Kingdom. |

Primary Examiner—Kevin P. Shaver
Attorney, Agent, or Firm—Morgan & Finnegan

[57] ABSTRACT

A device is provided for controlled dispensing of a measured quantity of fluid from a flexible container. The device has a chamber adapted to hold a measured quantity of fluid when the container is inverted and righted. This fluid is then dispensed from the chamber through a conduit in direct response to a force exerted on the flexible wall of the container.

8 Claims, 7 Drawing Sheets

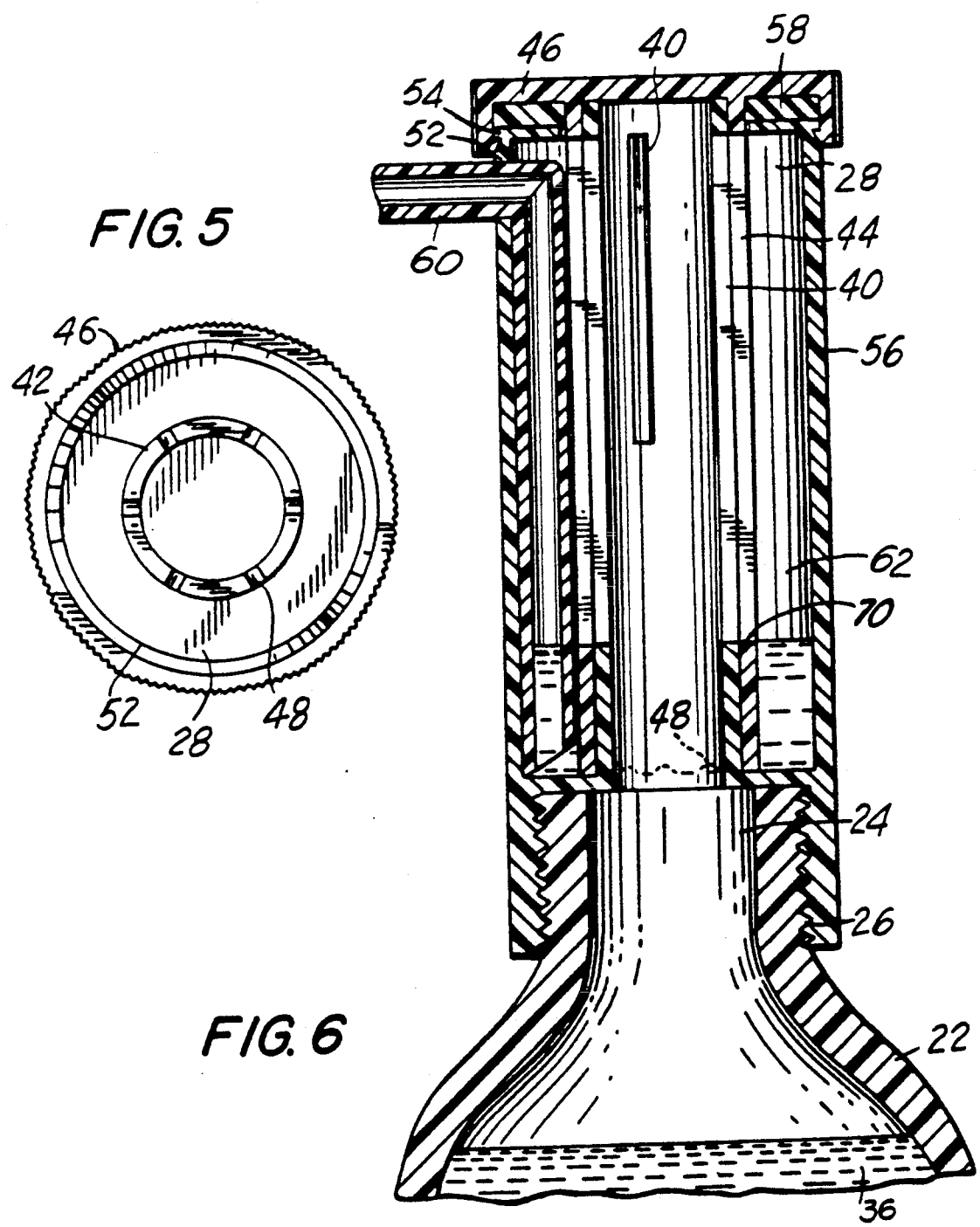

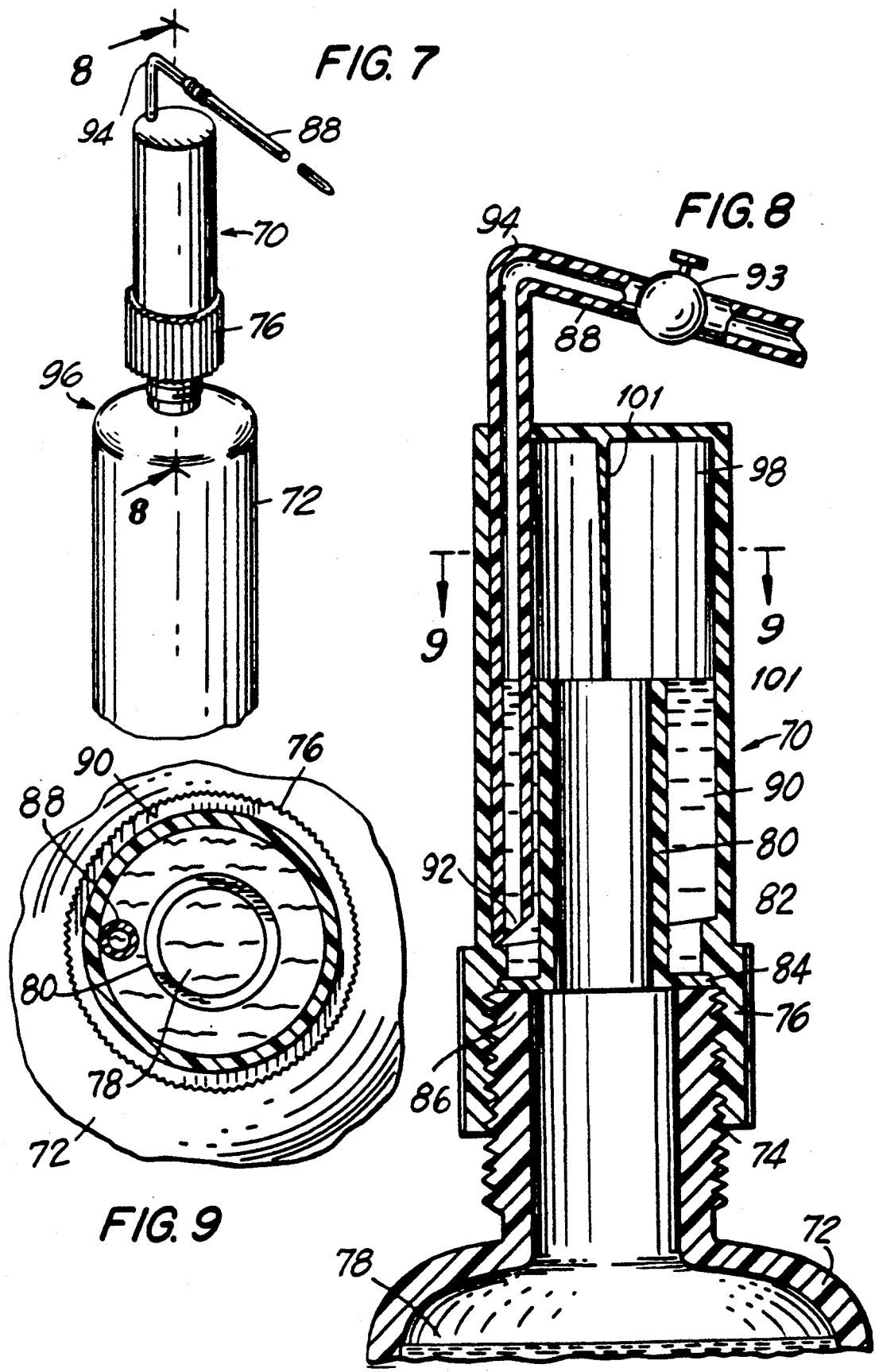

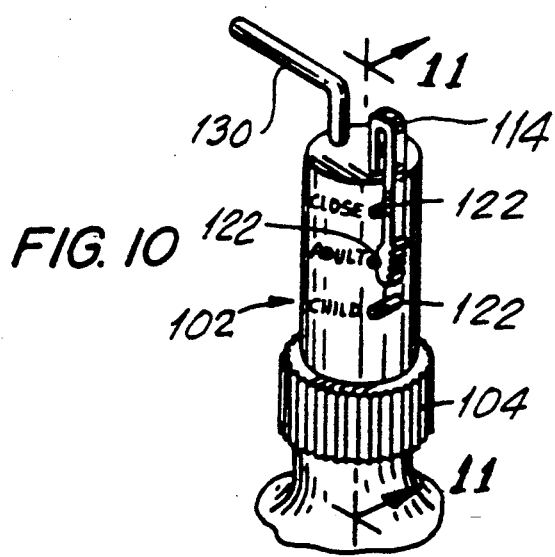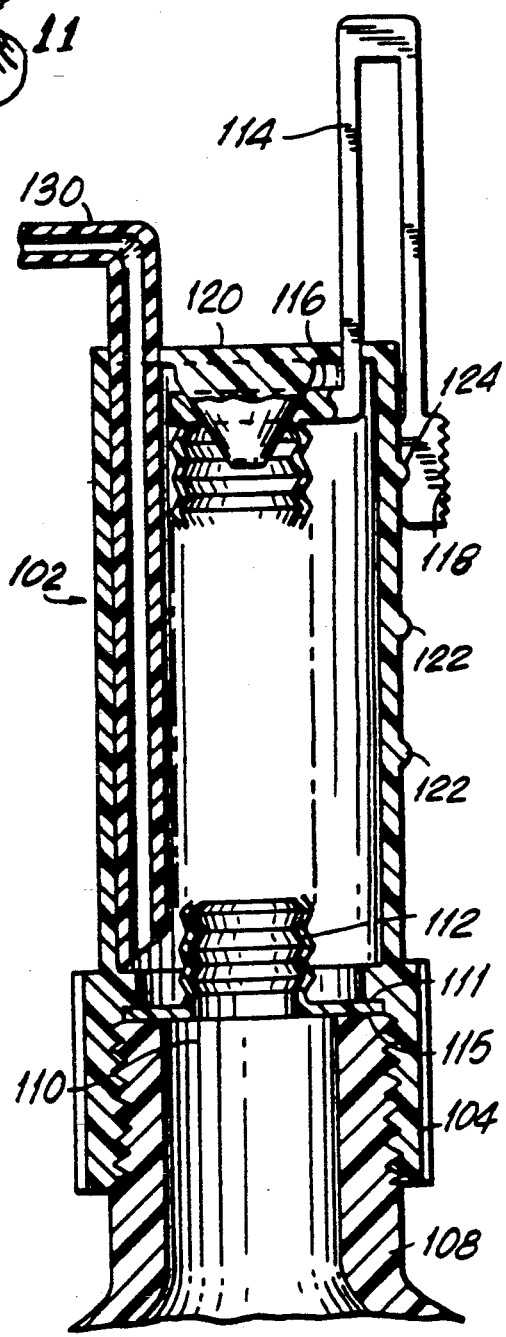

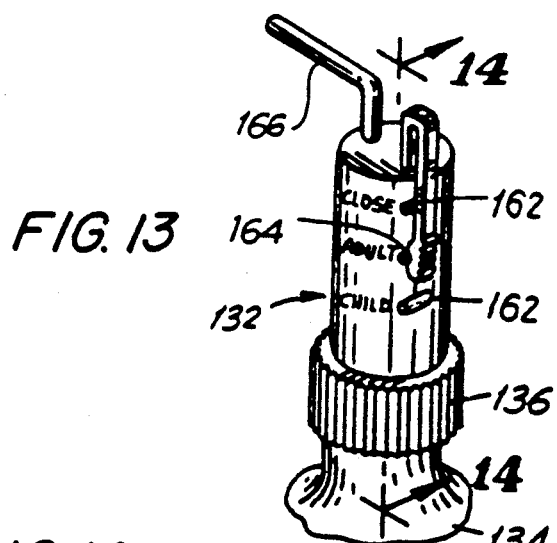
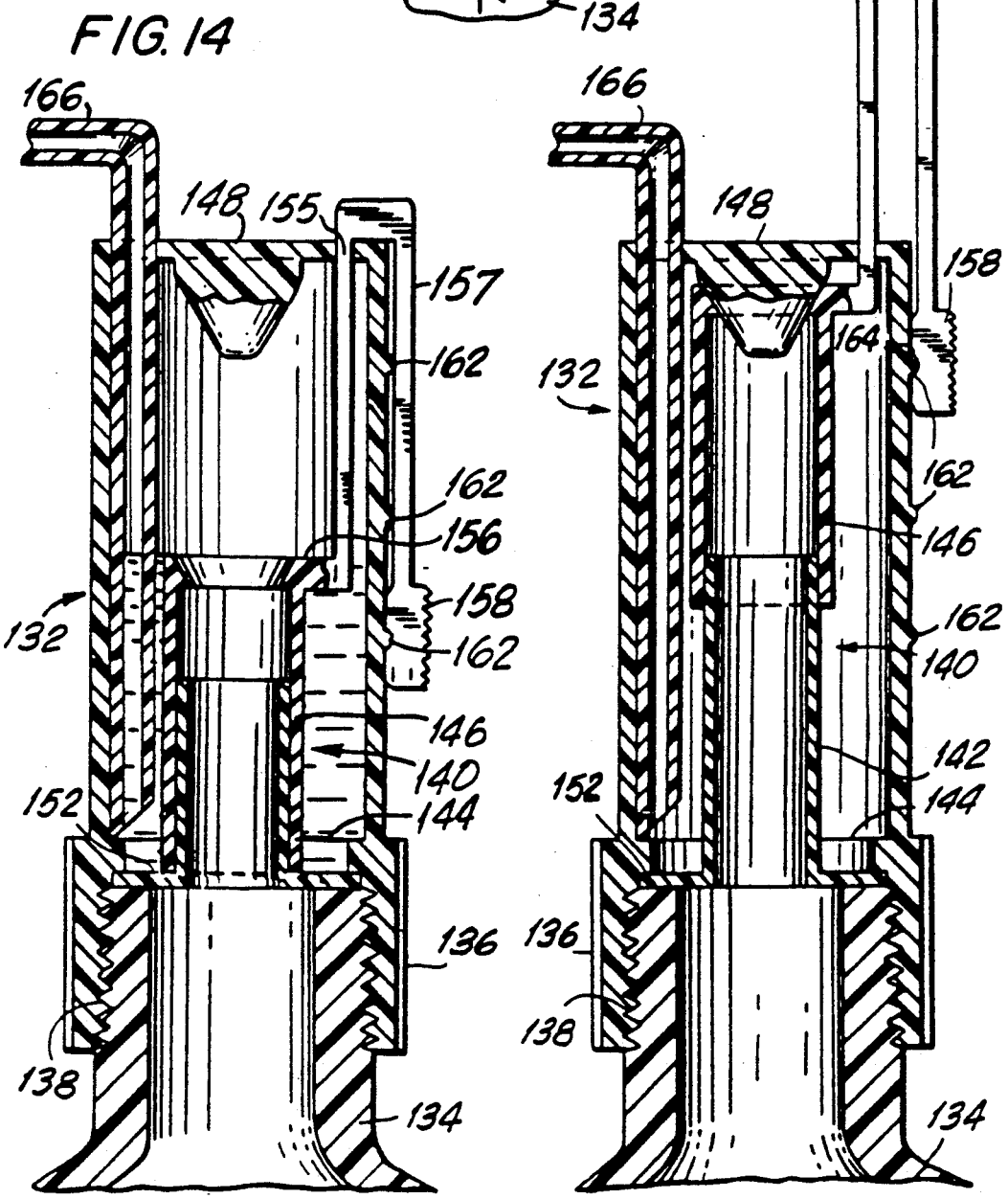
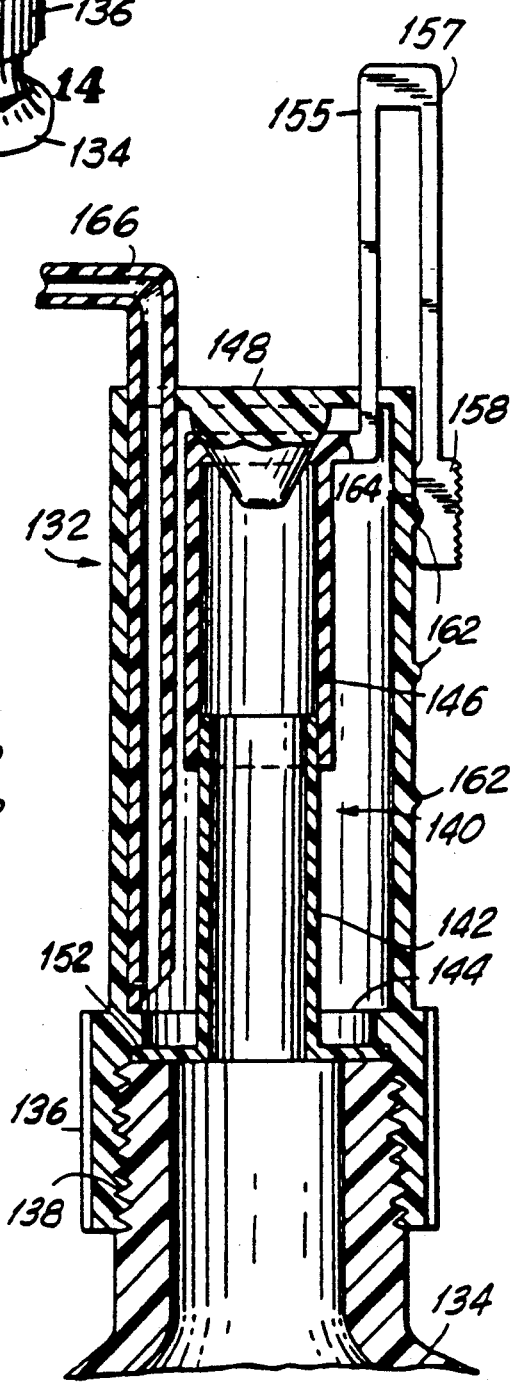

DEVICE FOR THE CONTROLLED MEASURING AND DISPENSING OF A FLUID

CROSS REFERENCE TO RELATED APPLICATIONS

This is a divisional of application Ser. No. 07/640,527, filed Jan. 10, 1991, now U.S. Pat. No. 5,119,911, which was a continuation of application Ser. No. 07/410,157, filed Sep. 20, 1989, now abandoned, which was a continuation-in-part of application Ser. No. 07/117,356, filed Oct. 27, 1987, now abandoned, which was itself a continuation-in-part of application Ser. No. 06/827,781, filed Feb. 7, 1986, now abandoned.

FIELD OF THE INVENTION

The present invention relates to apparatus for dispensing quantities of fluid from a container, and in particular to apparatus for accurately dispensing measured amounts of a liquid from a closed container of that liquid.

BACKGROUND OF THE INVENTION

There has been a long felt need for a simple, inexpensive and accurate device for dispensing a predetermined amount of fluid directly from a reservoir of that fluid without the need for separate measuring devices such as cups and/or measuring spoons. This need has existed, with varying requirements as to accuracy and service conditions, in such widely varying applications as dispensing of cough syrups, liquid soaps, detergents, antacids, traditional and veterinary medications, as well as the accurate dispensing of fluid components for various formula in research and development laboratories and hospitals.

A particularly advantageous application of such a device would be in the dispensing of both ethical and over-the-counter liquid medications. Although the dispensing of such medications does not, in many cases, require an analytical degree of accuracy and reproducibility, the usual approach of "teaspoon measurement" leaves much to be desired. For example, due to the many varied designs and capacities of teaspoons, a "one teaspoon" measurement could vary from 4 to 7.5 ml. In addition, an appreciable error can be introduced in the measuring process by the individual making the measurement; for example, an individual may habitually undercut the measurement to avoid spillage, whereas another individual may actually take a "heaping teaspoonful" in order to ensure good measure. It follows that, as the number of teaspoons required for the desired dosage increases, this margin of error is compounded. With regard to tablespoon measurement an even wider variance is encountered, and the actual quantity of medication administered could be anywhere from 12 to 24 ml. depending on the particular spoon used and the individual measuring the dosage. Also, when the particular medication is to be mixed with water or other liquid, the separate measuring device not only represents a possible source of inaccurate measurement but also a serious source of possible bacterial or viral contamination.

Another use of such a device would be in measuring and administering medication to individuals suffering from handicaps, neuromuscular disorders or debilitating diseases such as, for example, multiple sclerosis, Parkinson's disease, blindness or other condition where dispensing and/or administering the liquid medication utilizing a spoon or cup would be difficult or impossible. Currently, when the individual for whom medication is prescribed is, for instance, blind or has poor eyesight he must rely on supervisory personnel to dispense an accurate dosage. In the alternative, he can use a "braille" cup having raised annular rings formed in the sidewalls thereof to indicate the various dosages. Measurement using this device is accomplished by placing a finger within the cup at the appropriate ring representing the correct dosage and pouring the medication into the cup the fluid level reaches the finger. The drawbacks of these methods are readily apparent Full or part-time supervisory personnel are becoming increasingly expensive and the "braille" cup method is prone to potentially life-threatening inaccuracies.

In the field of veterinary medicine, there has also been a long felt need for measuring and dispensing apparatus capable of accurately and efficiently administering fluid medication to animals. To date this procedure has been accomplished through the use of tubes and eyedroppers wherein the veterinarian or owner would draw the correct dosage into the eyedropper or tube, insert the spout into the animal's mouth and expel the fluid. This method generates problems in that, should the animal fail to swallow the medication, a second application would be required. Further, repeated contact between the animal's mouth and the eyedropper, and then the eyedropper and the reservoir of medication, results in potentially dangerous contamination to the medication remaining in the reservoir.

Many devices have been proposed for the dispensing of controlled-volume increments of fluids from containers, but all have suffered from one or more of a number of disadvantages. For example, many of the proposed devices which operates by means of pressurizing the container holding the fluid have been prone to inaccuracy and erratic operation brought about by pressure differences between the ambient atmosphere and the vapor space over the fluid inside the device. Designs of this type tend to create a partial vacuum inside the container caused either by fluctuations in the ambient temperature and pressure or by altitude differences between the point where the dispenser is first joined to the container and the point of use. The partial vacuum could also be created by repeated withdrawals of fluid from the device without replacing the volume thus lost with an equivalent volume of air. This pressure differential tends to impede the flow of fluid out of the dispenser, resulting in dispensing of inaccurate dosages. By the same logic, an excess pressure in the apparatus will tend to promote an undesirably large outflow of the fluid causing an overdose or spillage.

This difficulty does not arise when the container is opened to the atmosphere to dispense a measured dosage with each one. However, when the container itself is opened directly to the atmosphere there is the attendant danger of spillage and/or contamination.

Devices which do not require opening for each use generally effect pressure equalization by allowing air to bubble into the reservoir of liquid medication simultaneously with the withdrawal of liquid therefrom. Heretofore this method required that the dispenser construction be rather complex to allow for the measured dispensing of the liquid and simultaneous pressure equalization. Some of these devices even made use of differential air pressure to control the flow of liquid and thereby cut off the flow at a desired volume. Such devices, however, require sophistication and expensive mechanical construction.

While the foregoing description of the background of the invention has been directed primarily in terms of measuring and dispensing of medication, it will be recognized that the same considerations apply, with varying degrees of emphasis, to a wide variety of other applications.

OBJECTS AND STATEMENT OF THE INVENTION

It is therefore an object of the present invention to provide an improved means for measuring and dispensing predetermined quantities of fluid from a reservoir of that fluid.

Another object is to provide measuring and dispensing apparatus having improved accuracy and reproducibility with respect to the volume dispensed.

Still another object is to provide a measuring and dispensing means which is capable of adjustment in a simple and convenient manner, to dispense a preselected and variable volume of fluid.

A further object of the present invention is to provide means for measuring and dispensing predetermined quantities of liquid from an attached reservoir without the necessity for separate measuring devices.

Another object of the present invention is to provide a measuring means for a liquid wherein a surplus quantity of the liquid fed into the measuring chamber will be returned into the container thereby insuring an accurate and consistent measurement.

A particularly desirable object of the present invention is to provide a measuring and dispensing means in which the foregoing objects are provided by the use of a simple, inexpensive apparatus.

The present invention provides a unique and novel solution to the problem of accurately measuring and dispensing predetermined amounts of a liquid material from conventional flexible-wall containers. The invention comprises a device for dispensing a measured quantity of fluid from a supply of said fluid, the device including a container having at least one flexible wall and means for providing a measured amount of fluid for discharge from the device. This means is further adapted to fit the container and is provided with a chamber adapted to hold the measured amount of fluid to be dispensed. The device is also equipped with a means for conducting the fluid from the container to the chamber when the device is inverted and for conducting when the device is righted, the amount of fluid in said chamber which is in excess of the measured amount back to the reservoir. This means for conducting the fluid preferably extends from the base of the chamber to about one-half the height of that chamber. This design feature permits the chamber to consistently retain and dispense correct measured dosages. This is because when the chamber is inverted, the chamber fills up until it reaches the top of the conduit. When the chamber is righted, a quantity of fluid must be present in the chamber which exceeds the height of the conduit thus permitting some overflow back into the reservoir.

If the conduit is too high, only a small portion of the fluid enters the chamber. When the chamber is righted, the fluid level may be below the top of the conduit thus preventing the chamber from returning a consistent accurate measure.

The volume of the conduit structure itself also must be taken into account since it displaces fluid when the chamber is righted. The device is also provided with means for discharging the measured amount of fluid held in the chamber, this means including a conduit from a location within the chamber and proximate its base such that the fluid is discharged in response to a force exerted on the flexible wall of the container. Advantageously, the container will be formed from a resilient material such as is commonly employed to form so-called "squeeze bottles". The measuring means can be constructed of a clear or translucent glass or plastic and is provided with a connection between the measuring means and the container. Where desirable, the measuring means may be incorporated into the top of the container to prevent access to or contamination of the liquid in the reservoir.

Basically, the measuring means includes a dispensing means and comprises an integral unit preferably of rigid translucent plastic or glass. The measuring means is provided with a measuring chamber for receiving, measuring and maintaining the fluid to be dispensed. The walls of the chamber can be provided with annular rings or other markings thereon to indicate the desired dosage visually.

In operation, the container-measuring means combination is inverted allowing the fluid to enter the measuring chamber by means of a passage between the chamber and the fluid reservoir. The fluid is allowed to fill the chamber and, when the container is righted, excess fluid is automatically permitted to flow back into the reservoir leaving a predetermined dosage of the fluid within the chamber to be dispensed at will by the user.

The dispensing means, advantageously in the form of a long tube which extends from within the measuring chamber (typically from a location proximate the chamber's base) to some point outside the chamber, acts as a conduit for the measured fluid. Dispensing is accomplished by squeezing a flexible side-wall of the container thereby to increase the pressure within the measuring chamber and force the measured portion of the fluid in the chamber through the dispensing tube into an appropriate receptacle or other desired location. The dispensing tube can also be provided with a flexible joint to allow the dispensed fluid to be more easily directed into a glass, or where desirable, directly into the mouth of the patient. This feature obviates the need for any other measuring device such as a spoon or glass and thus avoids inaccurate measurements and spillage.

A closure of valve can be positioned within the dispensing tube to seal the reservoir and measuring chamber and prevent accidental spillage of any fluid therein. Where the device is to be used to dispense liquids to several different persons the dispensing tube may also be provided with disposable tips or sheaths to prevent contamination and/or the spread of disease.

Where the invention is to be used for fluids that are sugar-based or are particularly sticky, the chamber can be designed to be stored in the inverted position thus keeping the chamber full of fluid at all times. This prevents gumming up of the dispenser caused by drying up of the fluid in the chamber between uses.

A further refinement of this invention is the provision of means within the measuring chamber for varying the amount of liquid retained in the chamber once it is inverted and righted in sequence. This is accomplished, for example, by providing means for varying the height of the fluid retained within the measuring chamber and/or by varying the capacity of the measuring chamber to allow for different quantities of liquid to be retained within the measuring chamber.

BRIEF DESCRIPTION OF THE DRAWINGS

The above and other objects, features and advantages of this invention will be apparent in the following detailed description of illustrative embodiments, especially when taken in conjunction with the accompanying drawings wherein:

FIG. 5 is a horizontal cross-sectional view, taken along line 5—5 FIG. 4, of the outer inlet tube;

FIG. 6 is a side elevational view, in cross-section, of the variable dose measuring chamber shown in FIG. 3;

FIG. 7 is a perspective view, in section, of another embodiment of the invention providing a single predetermined dosage;

FIG. 8 is a side elevational view, in cross-section, taken along line 8—8 of FIG. 7;

FIG. 9 is a horizontal cross-sectional view, taken along line 9—9 of FIG. 8 showing the single dosage embodiment of FIG. 7;

FIG. 10 is a perspective view, in section, of a variable dose embodiment of the invention;

FIG. 11 is a side elevational view in cross-section, taken along line 11—11 of FIG. 10 showing the slide and tube position for the adult dose in the embodiment of FIG. 10;

FIG. 12 is a side elevational view, in cross-section, showing the slide and tube position for closure of the chamber in the embodiment of FIG. 10;

FIG. 13 is a perspective view, in section, of another variable dose embodiment of the invention;

FIG. 14 is a side elevational view, in cross-section, taken along line 14—14 of FIG. 13, with the slide and tube in the adult dose position; and FIG. 15 is a side elevational view, in cross-section, of the slide and tube of FIG. 14 in the closed position.

DETAILED DESCRIPTION OF PREFERRED EMBODIMENTS

Figure 2:
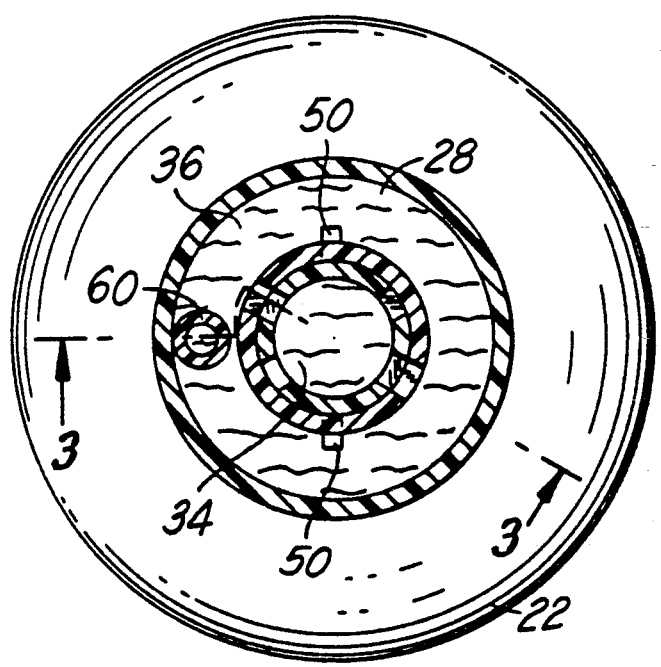
FIG. 2 is a horizontal cross-sectional view, taken along line 2—2 of FIG. 1, of the measuring chamber shown in FIG. 1.
Figure 1:
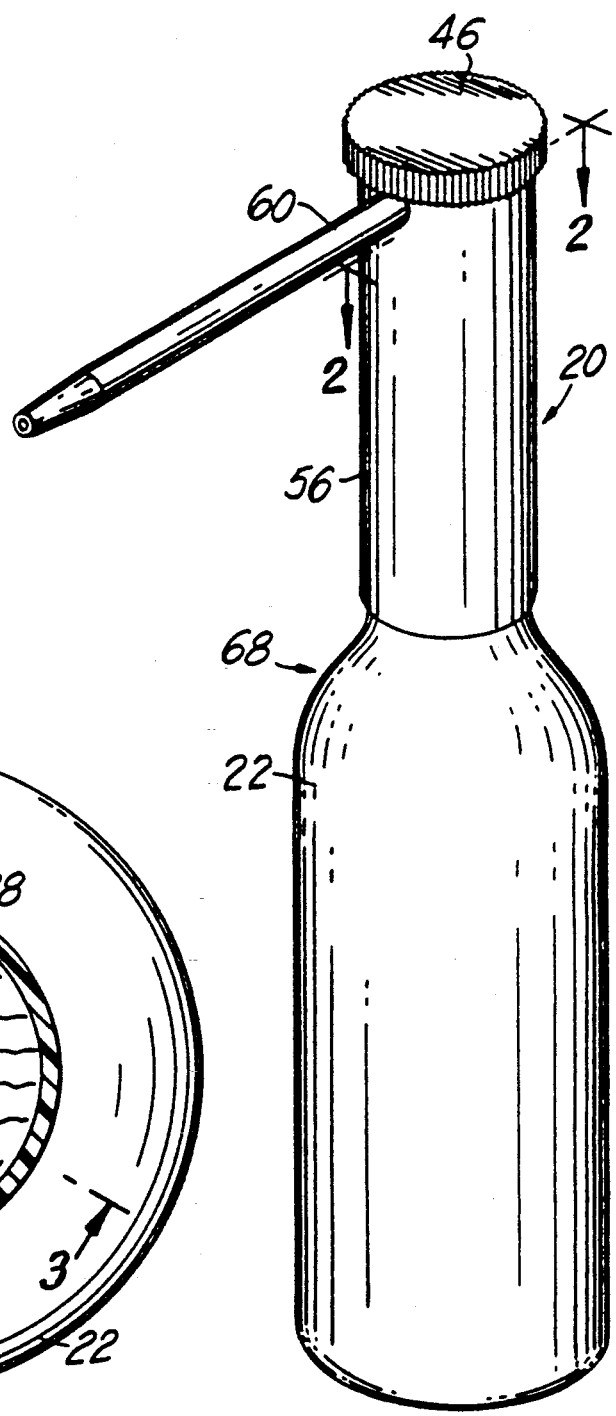
FIG. 1 is a perspective view of showing one embodiment of the invention with the variable dose measuring chamber attached to a conventional squeeze bottle.
Figure 3:
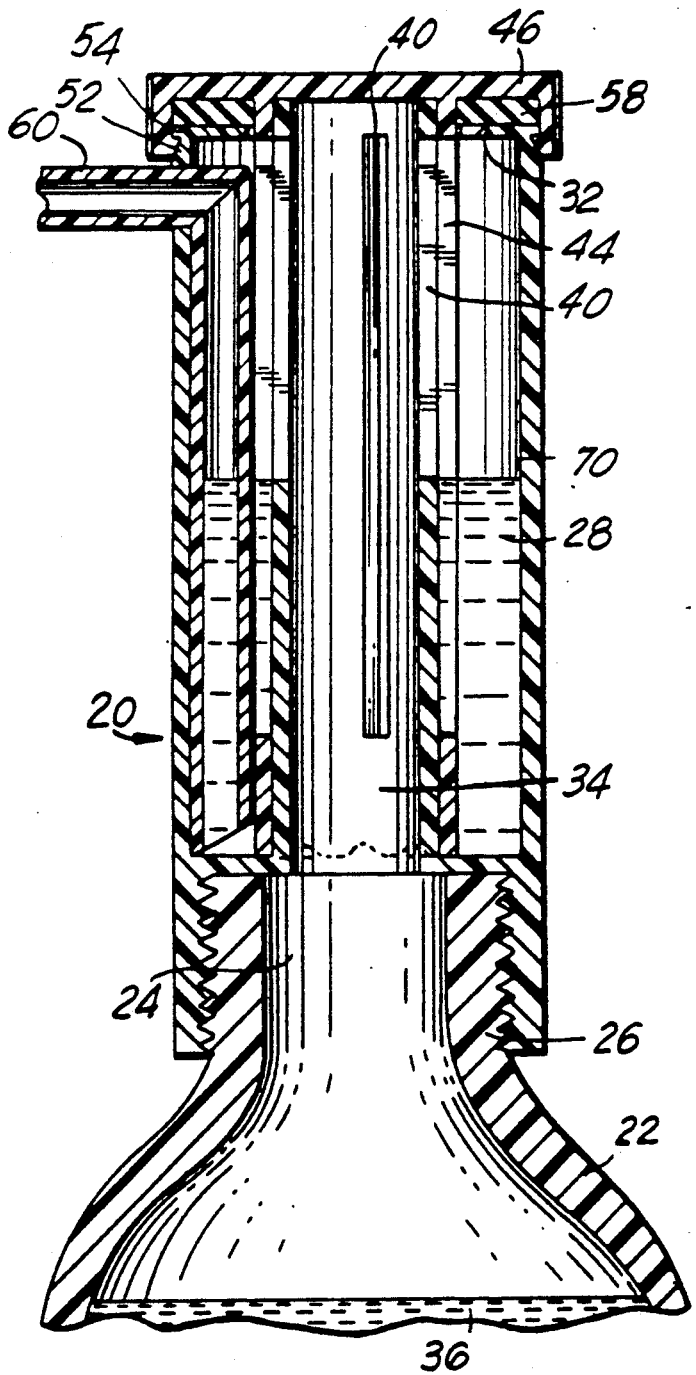
FIG. 3 is a side elevational view, in cross-section, taken along line 3—3 of FIG. 2, of the measuring chamber and squeeze bottle shown in FIG. 1.
Figure 4:
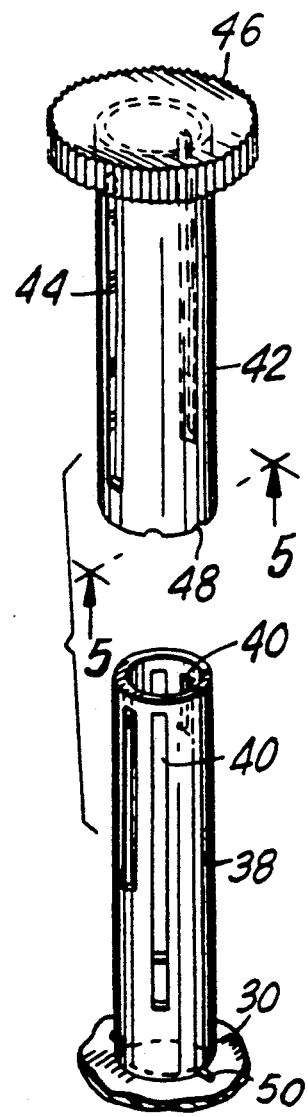
FIG. 4 is an exploded view, in perspective, of one embodiment of the inlet tubes of the measuring chamber.

Referring now to the drawings, and in particular to FIGS. 1-6, there is depicted an apparatus in accordance with one embodiment of the present invention. The apparatus, denoted generally at 20, is mounted on the top of a conventional flexible-wall container 22 which container includes a mouth 24 having threads 26 provided circumferentially thereabout (see FIG. 3). Other forms of connection between the apparatus 20 and the container 22 are also suitable as circumstances dictate—e.g., a frictional insertion of the bottom of the apparatus into the top of a bottle in place of a cork or plastic stopper.

Enclosed within the apparatus 20 is a dosage measuring chamber 28 of cylindrical construction having a base portion 30 and a top portion 32. A passage 34 is formed in the base portion 30 of the chamber 28 to permit fluid 36 contained within the flexible-wall container 22 to pass between the dosage measuring chamber 28 and the flexible wall container 22. In this embodiment of the invention, this passage 34 opens into an inner tube 38 which is open at its distal and proximal ends. This inner tube 38 is provided with a plurality of vertical slots 40 of varying lengths (best shown in FIG. 4). The inner tube 38 is fixed to the base portion 30 of the dosage measuring chamber 28. An outer tube 42 is rotatably imposed over the inner tube 38 and adapted for movement between multiple positions. The outer tube 42 is provided with a plurality of vertical slots 44 which are at least of the same length as the longest slot in the inner tube 38. Preferably, these slots are positioned so that the top of the uppermost slot is located about half the height of the inner tube 38. In this embodiment of the present invention the outer tube 42 is also provided with a knurled knob 46 fixed to the upper end of the outer tube 42 to facilitate rotation of the outer tube.

The lower end of the outer tube has a series of notches 48 which engage protrusions 50 formed in the base portion 30 of the dosage measuring chamber 28. These notches 48 are positioned to engage protrusions 50 at points of alignment between vertical slots 40 in the inner tube 38 and vertical slots 44 in the outer tube 42. Optionally, notches 48 may be provided to engage protrusions 50 at points where the vertical slots 44 in the outer tube 42 do not align with the variable length vertical slots 40 in the inner tube, thus effectively sealing the dosage measuring chamber 28 from the fluid reservoir in the flexible wall container 22.

In this embodiment of the invention, sealing of the top of the dosage measuring chamber 28 is accomplished by providing knob 46 with an internal peripheral lip 52 which sealably engages a concentric notch 54 in the upper wall 56 of the dosage measuring chamber 28. This sealing may be further supplemented by interposing a seal 58 between the knob 46 and the top portion 32 of the dosage measuring chamber 28.

A discharge tube 60 is positioned within the dosage measuring chamber to provide a suitable conduit for the measured fluid 62 to be expelled from the dosage measuring chamber 28. The lower end 64 of the discharge tube 60 is advantageously provided with an angled opening 66 positioned in contact with or in close proximity to the base portion 30 of the dosage measuring chamber 28. This arrangement facilitates complete expulsion of the measured fluid through the exit tube and avoids the accumulation of excess fluid in the base of the chamber after dispensing is complete.

To measure a dosage of medication using the apparatus according to this embodiment of the invention, the knob 46 is first rotated until the vertical slots 44 in the outer tube 42 align with the appropriate vertical slots 40 in the inner tube 34 representing the desired dosage. This alignment may be accomplished by means of appropriate markings placed on the walls of the dosage measuring chamber and/or by forming the side walls 56 of the dosage measuring chamber 28 of a transparent or translucent material which permits visual confirmation of the appropriate alignment. Once slots 44 and 40 have been aligned, the chamber-container assembly, indicated generally at 68, is inverted permitting the fluid 36 contained in the reservoir to flow through passage 34 and aligned slots 40, 44 and fill the dosage measuring chamber 28. Subsequently, the assembly 68 is restored to its original upright position causing excess fluid in the dosage measuring chamber to drain back into the reservoir until the level of fluid 62 within the chamber reaches the bottom 18 edge 70 of the inner slot 40. It is readily apparent to one skilled in the art that by varying the height of bottom edge 70 relative to the base portion 30 and/or by increasing the diameter of the chamber wall 56, a variable dosage may be maintained within the dosage measuring chamber 28.

After the assembly 68 is restored to its original upright position and the excess fluid has drained back into the reservoir 36, the liquid representing the desired dosage is maintained within the dosage measuring chamber 28 to await dispensing by the user. This dispensing is accomplished by compressing a flexible wall of container 22 thus creating a pressure differential between the fluid within the assembly 68 and the ambient environment. This pressure differential causes the expulsion of the measured fluid 62 through discharge tube 60; the discharging fluid can be directed as desired.

In certain embodiments of the invention, such as that depicted, the fluid contained within the reservoir may be sealed from the ambient conditions by rotating the outer tube 42 so that the vertical slots 44 are not aligned with any of the vertical slots in the inner tube 34. In this manner, the assembly may be stored or shipped in any attitude without the fear of leakage or contamination.

FIGS. 7-9 show a simplified embodiment of the present invention capable of measuring and dispensing a single predetermined dosage from a reservoir of fluid contained in a flexible-walled container. In this embodiment a simplified dosage measuring chamber is utilized (indicated generally at 70) which is mounted on the top of a conventional flexible-walled container 72. The attachment means between the chamber and the container 72 may be a threaded connection 74 as shown or any other type of engagement which provides an acceptable seal between the chamber and the container.

The chamber 70 is provided with an internally threaded lower portion 76 optionally provided with a plurality of vertical ridges in the external periphery thereof to aid in the removal of the chamber. Communication between the reservoir of fluid 78 in the flexible-wall container 72 and the chamber 70 is provided by an open-ended tube 80 of fixed length which extends through the base portion 82 of the flexible-wall container 72 into the chamber 70 for a predetermined distance. Preferably, this predetermined distance is about one-half of the height of chamber 70. Sealing between the open-ended fixed length tube 80 and the container is provided by an annular shoulder 84 formed in the lower end of tube 80 which sealably abuts against the top lip 86 of the flexible walled container 72 when the threaded engagement 74 is properly tightened.

A discharge tube 88 is positioned within the dosage measuring chamber 70 to provide a conduit for the measured dosage of the liquid 90 to a point outside the chamber. This tube 88 is optionally provided with an angled end 92 positioned in close proximity to the base portion 82 and extends to a point outside the dosage measuring chamber. In the embodiment shown in FIGS. 7-9 this tube 88 is angled at 94 to more easily direct the measured dosage to the desired location. Optionally, base portion 82 can be sloped downward toward end 92 to ensure complete evacuation of the fluid in chamber 70. A valving means 93 may be positioned in a convenient location in the exit tube to seal the dosage measuring chamber 70 from ambient conditions. This may be desirable to avoid spillage or contamination.

To measure out a dosage of fluid utilizing this embodiment of the present invention, the valving means 94 is opened to vent the chamber and the chamber-container assembly 96 is inverted to permit fluid in the reservoir 78 to pass through the open-ended fixed length tube 80 and fill the dosage measuring chamber 70. Once this is accomplished, the assembly 96 is returned to its original upright position permitting any excess fluid located in the chamber 98 above the top edge 100 of the fixed length tube 80 to drain back into the container 72. Where the fluid to be dispensed is particularly viscous or where inlet tube 80 is narrow, a surface tension relieving means such as pin 101 can be formed adjacent the top edge 100 of the tube 80 to break the surface tension and to initiate flow of the excess fluid back into the reservoir 78. The fluid remaining in the dosage measuring chamber 70 represents an accurate predetermined dosage 90 of the fluid.

In order to dispense the fluid within the chamber 70, pressure is applied to the flexible-walled container 72 creating a pressure differential between the inside of the chamber-container assembly 96 and the ambient conditions. As in previously described embodiments, this pressure differential forces the measured fluid 90 out of the chamber and through discharge tube 88. In both embodiments heretofore discussed pressure must be continuously applied to the flexible-walled container until the liquid contained in the dosage measuring chamber is totally expelled. After dispensing is complete the chamber of the embodiment shown in FIGS. 7-9 may be sealed by moving valving means 93 to a closed position.

Further embodiments of the present invention are shown in FIGS. 11-15. These embodiments show alternative means for measuring and dispensing variable doses of a fluid from a reservoir of that fluid maintained in a flexible-walled container.

Referring now to FIGS. 10-12, a variable dosage measuring chamber, indicated generally at 102, is provided with an internally threaded lower portion 104 which engages external threads 106 formed in the upper potion of flexible-walled container 108. It would be readily apparent to one skilled n the art that this securement between the chamber 102 and the container 108 may be accomplished by any other appropriate engagement method. Communication between the mouth 110 of the container 108 is provided by means of a flexible accordion tube 112 which extends into the measuring chamber 102. Preferably, tube 112 extends to about one-half the height of chamber 102 for dispensing its maximum dosage. Sealing between the measuring chamber 102 and the container 108 is accomplished by an annular shoulder 111 in the lower end of tube 112, which shoulder sealably abuts the top lip 115 of the container when the threaded engagement 104 is properly tightened.

Tube 112 is alternately elongated or compressed by means of an inverted U-shaped member 114 which connects the upper lip 116 to slide member 118. The upper lip 116 of the flexible accordion tube 112 is flanged so as to sealably engage the frustrum of an abbreviated, inverted cone-shaped plug 120 when the flexible tube is extended to its maximum length as shown in FIG. 12. This plug 120 is fixed in the inside upper portion of the variable dosage measuring chamber 102. Alternatively, sealing of the variable dosage measuring chamber 102 may be accomplished utilizing any other appropriate shapes or configurations wherein the upper end of the flexible accordion tube 112 is closed to the atmosphere.

In this embodiment of the present invention the appropriate dosage is selected by positioning slide member 118 at the appropriate position corresponding to the dosage to be administered. Advantageously, means are provided to maintain the slide member (and the flexible accordion tube attached thereto) at the desired position without moving. This can be accomplished by forming a plurality of vertically situated horizontal protrusions 122 along the periphery of the outside wall of the dosage measuring chamber adjacent the slide member 118. Slide member 118 is correspondingly provided with a horizontal notch 124 which frictionally engages protrusion 122 and maintains the flexible accordion tube 112 in the desired location. In the embodiment shown in FIGS. 10-12 there are provided three protrusions 122 spaced vertically along the side wall of the variable dosage measuring chamber 102 and are labelled from bottom to top respectively child, adult, and close (FIG. 10). By positioning slide member 118 at the "child" protrusion, the flexible accordion tube 112 is compressed to a predetermined length which would permit a children's dosage to be maintained within the measuring chamber 102 when the combined chamber-container assembly is inverted and restored to its original upright position.

Closure of this embodiment is accomplished by moving slide member 118 to its uppermost position (indicated by the protrusion adjacent the "close" position shown in FIG. 10) which causes the flanged lip 116 to sealably engage the frustrum of the inverted cone-shaped plug 120. In this manner, this embodiment of the apparatus may be sealed from contamination and spillage.

Dispensing of a measured dosage of fluid 126 is accomplished in substantially the same manner as described in the previous embodiments. Slide member 118 is positioned for the desired dosage and the chamber-container assembly is inverted to permit fluid contained in the reservoir to pass through the flexible accordion tube 112 and fill the chamber 102. The assembly is then restored to its upright position and any excess fluid above lip 116 of the tube 112 flows back into the reservoir 108 leaving a predetermined dosage within the chamber. Pressure is then applied to the flexible-walled container 108 to create a pressure differential between the inside of the chamber 102 and the ambient conditions thus forcing the measured dosage of fluid 126 contained within the chamber through discharge tube 130. This discharge tube is positioned within the chamber 102 with its lower end in close proximity to the lower portion 131 of the chamber. This lower portion is advantageously angled to facilitate complete dispensing of the fluid. The discharge opening (not shown) is outside the confines of the chamber and may exit out the top of the chamber (FIG. 10) or the side of the chamber (as shown in FIG. 6).

FIGS. 13-15 depict another preferred embodiment similar to that embodiment shown in FIGS. 10-12. A variable dosage measuring chamber 132 is threadably attached to a flexible-walled container 134. Engagement is accomplished by providing an internally threaded lower portion 136 which interlocks with the external threads 138 around the periphery of the mouth of the bottle 134. Communication between the reservoir of fluid in container 134 and the variable dosage measuring chamber 132 is provided by a telescoping tube member 140 made up of an inner tube 142 and an outer tube 146. The inner tube 142 is open on either end and fixed to the base portion 144 of the chamber 132. The outer tube 146 is slidably inserted over inner tube 142 in telescoping relationship. Preferably, outer tube 146 extends to about one-half height of the chamber 132 for dispensing its maximum dosage. The upper portion of outer tube 146 is flanged so as to sealably engage the frustrum of an inverted, abbreviated cone-shaped plug 148 fixed to the top portion 150 of the chamber 132 when the outer tube 146 is fully, vertically extended.

Sealing between the container 134 and the measuring chamber 132 is accomplished by means of a shoulder 152 formed in the lower end of the inner tube 142. As the internally threaded lower portion 136 of the chamber 132 is tightened onto the mouth of the container 134, the top edge of the mouth of the container 134 sealably abuts shoulder 152 creating a leak-proof passage between the container 134 and the chamber 132.

Outer tube 146 is vertically movable by means of an inverted U-shaped member 154 in which one arm 155 extends into the chamber 132 and attaches to the top edge 156 of the outer tube 146. A slide member 158 is attached to the other arm 157 of the inverted U-shaped member 154 and is movable between a plurality of vertical positions to vary the amount of fluid retained within the measuring chamber 132. In this embodiment of the present invention there are provided three positions between which slide 158 may be moved. These positions include a children's dosage (in phantom at 160 of FIG. 14), an adult dosage position shown in solid lines in FIG. 14 and a closed position shown in solid lines in FIG. 15. The slide position is maintained by means of horizontal protrusions 162 aligned vertically along the outer wall of the chamber 132. A horizontal notch 164 is formed in slide member 158 to frictionally engage protrusions 162 and maintain the slide in the desired position.

The measured fluid is expelled from the chamber through a discharge tube 166 which extends from the base portion 144 of the discharge chamber 132 vertically through the upper portion of the chamber for delivery of the measured fluid to the desired location. The bottom edge of tube 166 is preferably angled as shown in FIGS. 14-15 to facilitate accurate and complete discharge of the measured fluid.

Figure 16:
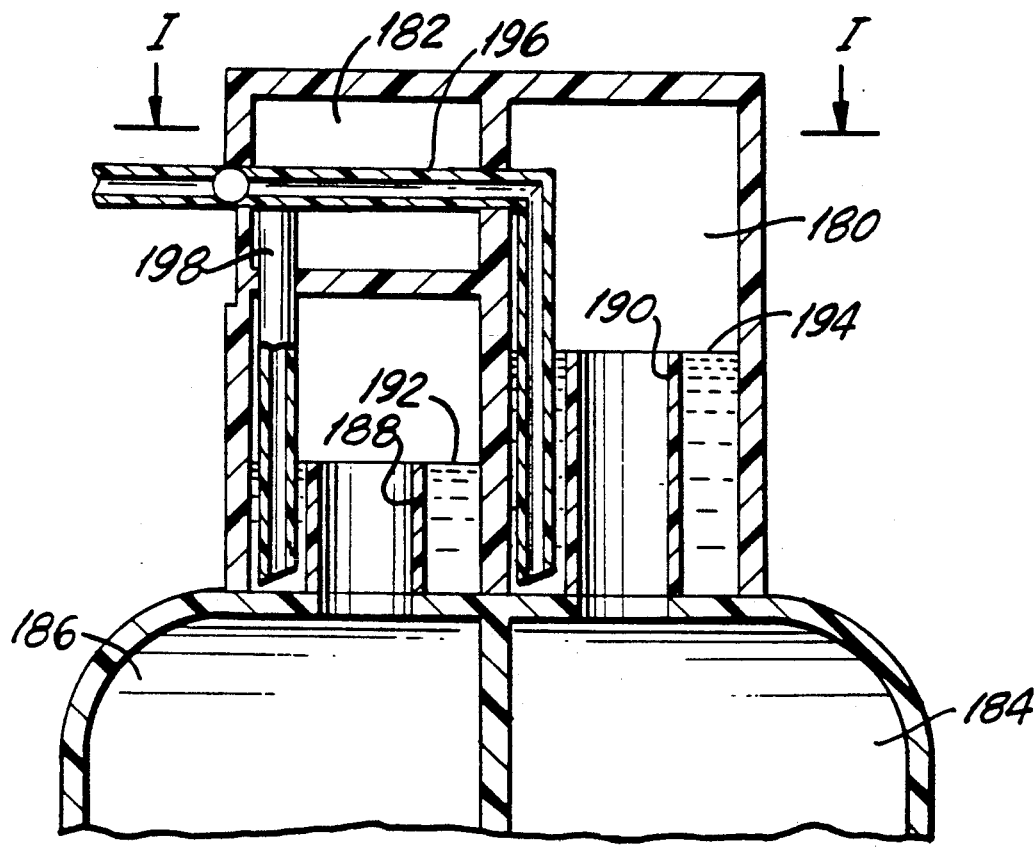
FIG. 16 is a side view of the invention incorporating two independent measuring chambers and reservoirs.
Figure 17:
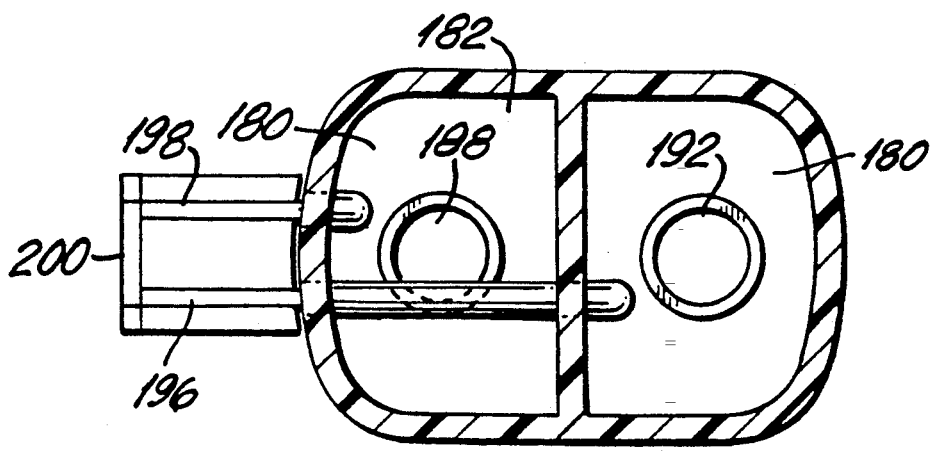
FIG. 17 is a top view through line I—I in FIG. 16 of the invention incorporating two independent measuring chambers and reservoirs.

FIGS. 16 and 17 show an embodiment of the present invention wherein chambers 180 and 182 interconnect with separate reservoirs 184 and 186, respectively, in the same dispenser. In this embodiment chamber 180 and reservoir 184 are separate and independent from chamber 182 and reservoir 186 thus allowing the simultaneous measuring and dispensing of two separate fluids in a single operation. This ability is particularly useful where two reactive fluids are to be mixed prior to use.

Chambers 180 and 182 can be designed to measure either equal or different amounts of fluid. In the embodiment of FIGS. 16 and 17, inlet tubes 188 and 190 extend varying lengths into chambers 182 and 180, respectively, to measure and retain different amounts of fluid 192 and 194 when the dispenser is inverted and righted.

Dispensing is accomplished in the same manner as described in the previous embodiments. Where two reactive fluids are to be mixed outside the chambers, the conduit and venting means 198 and 196 can be brought together in a mixing chamber 200 just prior to expulsion from the conduit and venting means.

Other embodiments are also possible for retaining varying amounts of separate fluids. These include varying the overall capacity of either chamber or by incorporating a moveable partition between the measuring chambers to measure out preselected amounts.

Although particular illustrative embodiments of the present invention have been described herein, the present invention is not limited to these embodiments. Various changes, substitutions and modifications may be made thereto by those skilled in the art without departing from the spirit or scope of the invention defined by the appended claims.

I claim:

1. A device for dispensing measured quantities of liquid from a supply of same comprising, in combination:
   a container having at least one flexible wall and a discharge opening;
   a measuring means adapted to fit said discharge opening, said measuring means having a chamber adapted for dispensing therefrom a liquid held therein;
   means for conducting said liquid between said contained and said chamber when the device is inverted and means for retaining in the chamber a variable measured said means for conducting comprising adjustable amount of said liquid when the device is returned to the upright position;
   means for discharging said liquid held in said chamber said means for discharging including conduit means extending from a location within the chamber and proximate its base to a point outside said device such that said liquid is discharged from said chamber in response to a force exerted on said flexible wall of said container;
   wherein said means for conducting said liquid between said container and said chamber when the device is inverted comprises a first tube portion and a second tube portion engaging said first tube portion, said adjustable means comprising at least one opening formed in said first tube portion and at least one opening formed in said second tube portion such that said openings can be placed in alignment by rotating one of said tube portions, and movable means by which one of said tubes can be grasped and rotated.

2. A device defined as in claim 1, wherein the at least one opening in said first tube portion comprises at least one variable-length elongated slot oriented in the direction of the longitudinal axis of the tube portion, and the at least one opening in the second tube portion comprises at least one elongated slot which is alignable with said at least one slot in said first tube portion.

3. A device as defined in claim 1, wherein the first tube portion is fixed in the measuring chamber and a part of said first tube portion is concentrically disposed within an opposed part of said second tube portion which is rotatable around said first tube portion by said movable means which comprises a knob attached to a remote end of said second tube portion.

4. A device for dispensing measured quantities of liquid from a supply of same comprising, in combination:
   a container having at least one flexible wall and a discharge opening;
   a measuring means adapted to fit said discharge opening, said measuring means having a chamber adapted for dispensing therefrom a liquid held therein;
   means for conducting said liquid between said container and said chamber when the device is inverted and said means for conducting comprising adjustable means for retaining in the chamber a variable measured amount of said liquid when the device is returned to the upright position;
   means for discharging sad liquid held in said chamber, said means for discharging including conduit means extending from a location within the chamber and proximate its base to a point outside said device such that said liquid is discharged from said chamber in response to a force exerted on said flexible wall of said container;
   wherein said adjustable means for providing a variable measured amount of liquid for discharge comprises a vertically axial flexible walled tube and a means for moving said tube vertically.

5. A device as defined in claim 4, further comprising closure means disposed at the top of said chamber to close off the liquid in the container and prevent its entry into said measuring chamber when said flexible walled tube is extended.

6. A device as defined in claim 4, wherein said means for moving the flexible walled tube comprises a slide attached thereto and extending through a wall of said chamber such that the flexible walled tube is movable with the slide to vary the measured amount of liquid held in said chamber.

7. A device as recited in claim 4, wherein said measured amount of liquid is changeable by altering the vertical axial height of said flexible walled tube inside of said chamber by operating said means for moving.

8. A device for dispensing measured quantities of liquid from a supply of same comprising, in combination:
   a container having at least one flexible wall and a discharge opening;
   a measuring means adapted to fit said discharge opening, said measuring means having a chamber adapted for dispensing therefrom a liquid held therein;
   means for conducting said liquid between said container and said chamber when the device is inverted and said means for conducting comprising adjustable means for retaining in the chamber a variable measured amount of said liquid when the device is returned to the upright position;
   means for discharging said liquid held in said chamber, said means for discharging including conduit means extending from a location within the chamber and proximate its base to a point outside said device such that said liquid is discharged from said chamber in response to a force exerted on said flexible wall of said container; wherein said adjustable means for providing a variable measured amount of liquid for discharge comprises a tube extending into said chamber, said tube having a sleeve which is telescopically adjustable in relation to said tube to vary the quantity of liquid held in the chamber when the container is righted.

* * * * *